(12) United States Patent
Hily et al.

(10) Patent No.: US 7,603,527 B2
(45) Date of Patent: Oct. 13, 2009

(54) RESOLVING FALSE DEPENDENCIES OF SPECULATIVE LOAD INSTRUCTIONS

(75) Inventors: Sebastien Hily, Hillsboro, OR (US); Zhongying Zhang, Portland, OR (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 11/541,364

(22) Filed: Sep. 29, 2006

(65) Prior Publication Data

US 2008/0082765 A1    Apr. 3, 2008

(51) Int. Cl.
*G06F 13/14* (2006.01)
*G06F 12/08* (2006.01)
*G06F 9/38* (2006.01)

(52) U.S. Cl. .................. 711/158; 711/203; 712/216

(58) Field of Classification Search .......... None
See application file for complete search history.

(56) References Cited

U.S. PATENT DOCUMENTS

| | | | |
|---|---|---|---|
| 4,375,678 A | 3/1983 | Krebs | |
| 4,531,147 A | 7/1985 | Kouyama | |
| 5,201,052 A | 4/1993 | Ohshima et al. | |
| 5,606,670 A * | 2/1997 | Abramson et al. | 711/154 |
| 5,644,769 A | 7/1997 | Hasiguti | |
| 5,687,336 A | 11/1997 | Shen et al. | |
| 5,764,938 A | 6/1998 | White et al. | |
| 5,768,610 A | 6/1998 | Pflum | |
| 5,828,868 A | 10/1998 | Sager et al. | |
| 5,850,543 A | 12/1998 | Shiell et al. | |
| 5,887,185 A | 3/1999 | Lynch | |
| 5,935,239 A | 8/1999 | Narayan | |
| 5,944,841 A | 8/1999 | Christie | |
| 6,079,006 A | 6/2000 | Pickett | |
| 6,119,223 A | 9/2000 | Witt | |
| 6,138,212 A | 10/2000 | Chiacchia et al. | |
| 6,256,721 B1 | 7/2001 | Witt | |
| 6,332,187 B1 | 12/2001 | Witt | |
| 6,622,235 B1 * | 9/2003 | Keller et al. | 712/23 |
| 6,662,280 B1 * | 12/2003 | Hughes | 711/156 |
| 6,665,792 B1 | 12/2003 | Merchant et al. | |
| 6,742,112 B1 | 5/2004 | Yoaz et al. | |
| 6,973,563 B1 | 12/2005 | Sander | |
| 7,017,026 B2 | 3/2006 | Yoaz et al. | |
| 2002/0109700 A1 | 8/2002 | Ma et al. | |
| 2004/0215934 A1 | 10/2004 | Yoaz et al. | |
| 2005/0027975 A1 | 2/2005 | Frommer et al. | |
| 2005/0154805 A1 | 7/2005 | Steely et al. | |
| 2007/0094475 A1 | 4/2007 | Bridges et al. | |
| 2007/0130448 A1 | 6/2007 | Jourdan et al. | |

OTHER PUBLICATIONS

Davis, Mark C., et al., "Stack Tracker", Intel Ref: P22032, U.S. Appl. No. 11/291,378, filed Dec. 1, 2005.

(Continued)

*Primary Examiner*—Denise Tran
(74) *Attorney, Agent, or Firm*—Caven & Aghevli LLC (57) ABSTRACT

Methods and apparatus for resolving false dependencies associated with speculatively executing load instructions in a processor core are described. In one embodiment, physical addresses of a load operation and a store operation are compared in response to a determination that the load operation may be potentially dependent on the store operation. Other embodiments are also described.

30 Claims, 6 Drawing Sheets

OTHER PUBLICATIONS

Bekerman, M. et al., "Early Load Address Resolution Via Register Tracking", 27th Annual International Symposium on Computer Architecture (Vancouver, British Columbia, Canada). New York,NY. ,(2000), pp. 306-315.

Microsoft Computer Dictionary, Fifth Edition, (2002), pp. 100, 354 and 491.

McKeeman, W. M., "Peephole Optimization", Communications of the ACM, vol. 8 (7), (Jul. 1965), pp. 443-444.

* cited by examiner

RESOLVING FALSE DEPENDENCIES OF SPECULATIVE LOAD INSTRUCTIONS

BACKGROUND

The present disclosure generally relates to the field of electronics. More particularly, an embodiment of the invention relates to techniques for resolving false dependencies associated with speculatively executing load instructions in a processor.

To improve performance, some processors may execute a load instruction speculatively, e.g., out-of-order with respect to store instructions assuming the load instruction is independent of the store instructions. To ensure that the load instruction is independent of the store instructions, the address associated with the load instruction may be checked against the store instruction addresses. However, performing a full address comparison may add latency and reduce performance. To reduce latency associated with performing a full address comparison, some processors may check a portion of the load instruction address against a portion of the store instruction addresses. This approach, however, may result in a situation where a partial match may occur, for example, indicating a false dependency. False dependencies may prevent a load instruction from executing which may, in turn, result in reduced performance in a processor.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various mechanisms, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" or "micro-operation" (which may be referred to as "uop") herein may be interchangeable.

Some of the embodiments discussed herein may be utilized to resolve potential dependencies of a speculative load instruction. For example, in an embodiment, after determining that a load operation may be potentially dependent on a store operation, the physical addresses of the load and store operations may be compared. As will be further detailed herein, e.g., with reference to FIG. 2, the result of the physical address comparison may be used to perform other operations in a processor, such as the processor cores discussed with reference to FIGS. 1-6.

Figure 1:
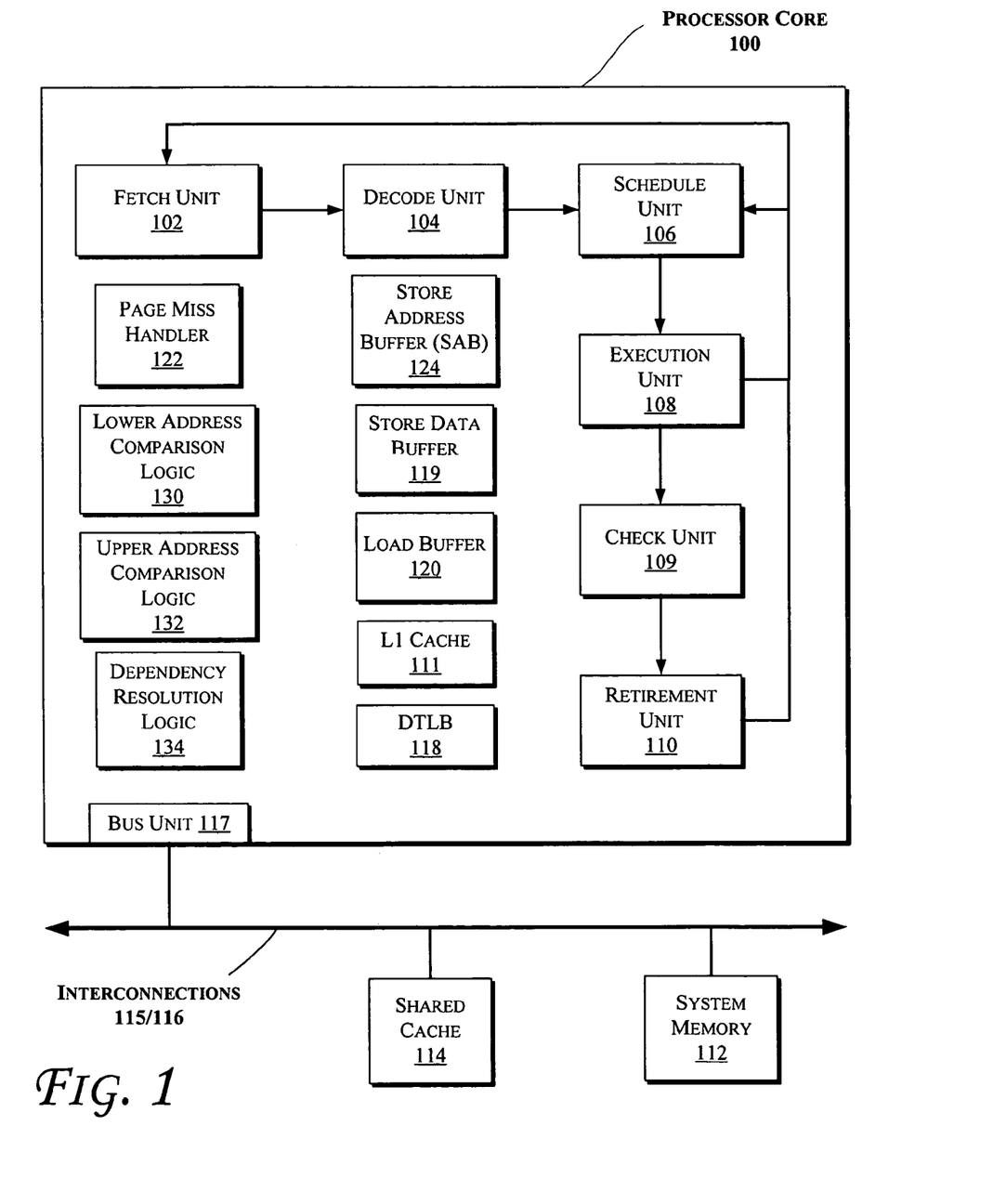
FIG. 1 illustrates a block diagram of portions of a processor core and other components of a computing system, according to an embodiment.

More particularly, FIG. 1 illustrates a block diagram of portions of a processor core 100, according to an embodiment of the invention. In one embodiment, the arrows shown in FIG. 1 indicate the flow direction of signals in the core 100. To reduce obscuring the illustrated embodiment, all connections between the components of the processor core 100 are not shown in FIG. 1. However, various components of the processor core 100 may communicate with each other, as may be suggested by various operations discussed herein. Also, as will be further discussed herein, e.g., with reference to FIGS. 4-6, one or more processor cores (such as the processor core 100) may be implemented on a single integrated circuit chip (or die). Moreover, the chip may include one or more shared or private caches, interconnects, memory controllers, etc.

As illustrated in FIG. 1, the processor core 100 may include a fetch unit 102 to fetch instructions for execution by the core 100. The instructions may be fetched from any storage devices such as the memory devices discussed with reference to FIGS. 4-6. The processor core 100 may include a decode unit 104 to decode the fetched instruction. For instance, the decode unit 104 may decode the fetched instruction into a plurality of uops (or micro-operations). The processor core 100 may further include a schedule unit 106 (which may be a reservation based (RS) scheduler in an embodiment). The schedule unit 106 may store decoded instructions (e.g., received from the decode unit 104) until they are ready for dispatch, e.g., until all source values of a decoded instruction become available. For example, with respect to an "add" instruction, the "add" instruction may be decoded by the decode unit 104 and the schedule unit 106 may store the decoded "add" instruction until the values that are to be added become available. Hence, the schedule unit 106 may schedule and/or issue (referred to generically herein as "dispatch") decoded instructions to various components of the processor core 100 for execution, such as an execution unit 108. The execution unit 108 may execute the dispatched instructions after they are decoded (e.g., by the decode unit 104) and dispatched (e.g., by the schedule unit 106).

In an embodiment, the execution unit 108 may include more than one execution unit, such as a memory execution unit, an integer execution unit, a floating-point execution unit, or other execution units. The execution unit 108 may execute instructions (or uops) out-of-order in some embodiments. Also, in one embodiment, an address may be generated at execution (e.g., by a component of the execution unit such as an address generation unit (AGU)) and used by a memory execution unit to perform memory-related operations. The execution unit 108 may also perform various arithmetic operations such as addition, subtraction, multiplication, and/or division, and may include one or more an arithmetic logic units (ALUs). In an embodiment, a co-processor (not shown) may perform various arithmetic operations in, conjunction with the execution unit 108. In turn, the executed instructions may be checked by check unit 109, e.g., to ensure that the instructions were executed correctly. A retirement unit 110 may retire executed instructions after they are committed. Retirement of the executed instructions may result in processor state being committed from the execution of the instructions, physical registers used by the instructions being de-allocated, etc.

As illustrated in FIG. 1, the retirement unit 110 may communicate with the schedule unit 106 to provide data regarding committed instructions. Moreover, the execution unit 108 may communicate with the schedule unit 106 to provide data regarding executed instructions, e.g., to facilitate dispatch of dependent instructions. Also, the execution unit 108 may communicate with the fetch unit 102, for example, to instruct the instruction fetch unit 102 to refetch an instruction when a branch misprediction or prediction violation occurs.

In one embodiment, such as shown in FIG. 1, the processor core 100 may include a level 1 (L1) cache 111 to, locally store data (e.g., including instructions) that may be stored in a system memory 112 and/or a shared cache 114. As shown in FIG. 1, the core 100 may communicate with the shared cache 114 and/or the system memory 112 through one or more interconnections (or buses) 115 and/or 116. The core 100 may further include a bus unit 117 to facilitate communication between the interconnections 115/116 and the core 100.

Additionally, the processor core 100 may include a data translation lookaside buffer (DTLB) 118, e.g., to enable translation between physical and virtual addresses. For example, when a store instruction is decoded by the decode unit 104 into a store address computation uop (e.g., an STA uop in accordance with at least one instruction set architecture) and a store data uop (e.g., an STD uop in accordance with at least one instruction set architecture), the store address computation uop may utilize the data stored in the DTLB 118 to compute the physical address of data associated with the decoded store instruction. The DTLB 118 may also allow for translation between physical and virtual addresses of a load instruction. Furthermore, a store data buffer 119 may store one or more bits of data corresponding to one or more pending memory store operations (or instructions) that have not been written back (or committed) to a memory (e.g., external to the processor core 100, such as the memory 112). Also, a load buffer 120 may store one or more bits corresponding to one or more pending memory load operations (or instructions), e.g., that have not been completed. In an embodiment, a memory ordering buffer (not shown) may include the buffer 119, buffer 120, buffer 124 (which, in an embodiment, may be a store address buffer (SAB) 124 (e.g., that may store one or more bits corresponding to pending store operations, e.g., including their physical addresses), logic 130, and/or logic 132. Furthermore, in one embodiment, a store buffer (not shown) may include the buffer 119, buffer 124, logic 130, and/or logic 132. Also, the buffers 119, 120, and/or 124 may be circular in various embodiments.

In some embodiments, instructions may be decoded in-order by the decode unit 104. When a store instruction is decoded, it is allocated an entry in the store buffer (e.g., including the store data buffer 119 and/or the SAB 124) that is referred to as the store buffer identifier (SBID). In an embodiment, a load operation may be allocated a load buffer identifier (LBID) in the load buffer 120. Load operations may also keep track of (or be correlated with) the SBID of the last allocated store operation, sometimes called a "store color." The store color may be used during processing of the load operation to distinguish the store operations that are older (e.g., from which the load operations may potentially receive data) from the stores that are younger (from which the load operations may not receive data). SBID or LBID may be allocated in-order, and wrap-around according to the size of the store buffer (e.g., including the store data buffer 119 and/or the SAB 124) or the load buffer 120.

As illustrated in FIG. 1, the core 100 may further include a page miss handler 122 (e.g., to handle misses in the DTLB 118). In some embodiments, memory may be organized in page increments (which may have 4 kByte, 8 kByte, 2 MByte, or other page sizes). The virtual address of a memory-related instruction (e.g., a load or store instruction or operation) may include two portions (where each portion may include one or more bits). The upper portion of the virtual address may correspond to the start of a memory page and the lower portion of the virtual address may be the offset into that page. As such, the lower portion of the virtual address may map to the lower portion of the corresponding physical address. Hence, the lower portion may be an untranslated portion of the address, whereas the upper portion may be a translated portion of the address (e.g., translated via the DTLB 118).

The core 100 may also include a lower address comparison logic 130 (which may also be referred to herein as "loosenet logic"), an upper address comparison logic 132 (which may also be referred to here in as "finenet logic"), and/or a dependency resolution logic 134. Moreover, the logic 130 may compare a lower portion (e.g., one or more of the least significant bits) of the virtual address of a load operation with a lower portion of the virtual address of one or more pending store instructions that were fetched by the fetch unit 102 prior to the load instruction. The logic 132, on the other hand, may compare the upper portion (e.g., one or more of the most significant bits) of the virtual address of the load operation with the upper portion of the virtual address of one or more pending store instructions that were fetched by the fetch unit 102 prior to the load instruction. As will be further discussed herein, e.g., with reference to FIG. 2 or 3, the logic 134 may resolve potential dependencies of a speculative load instruction. For example, in an embodiment, after determining that a load operation may be potentially dependent on a store operation (e.g., based on determination(s) by the logic 130 and/or logic 132), the logic 134 may compare the physical addresses of the load and store operations.

Figure 2:
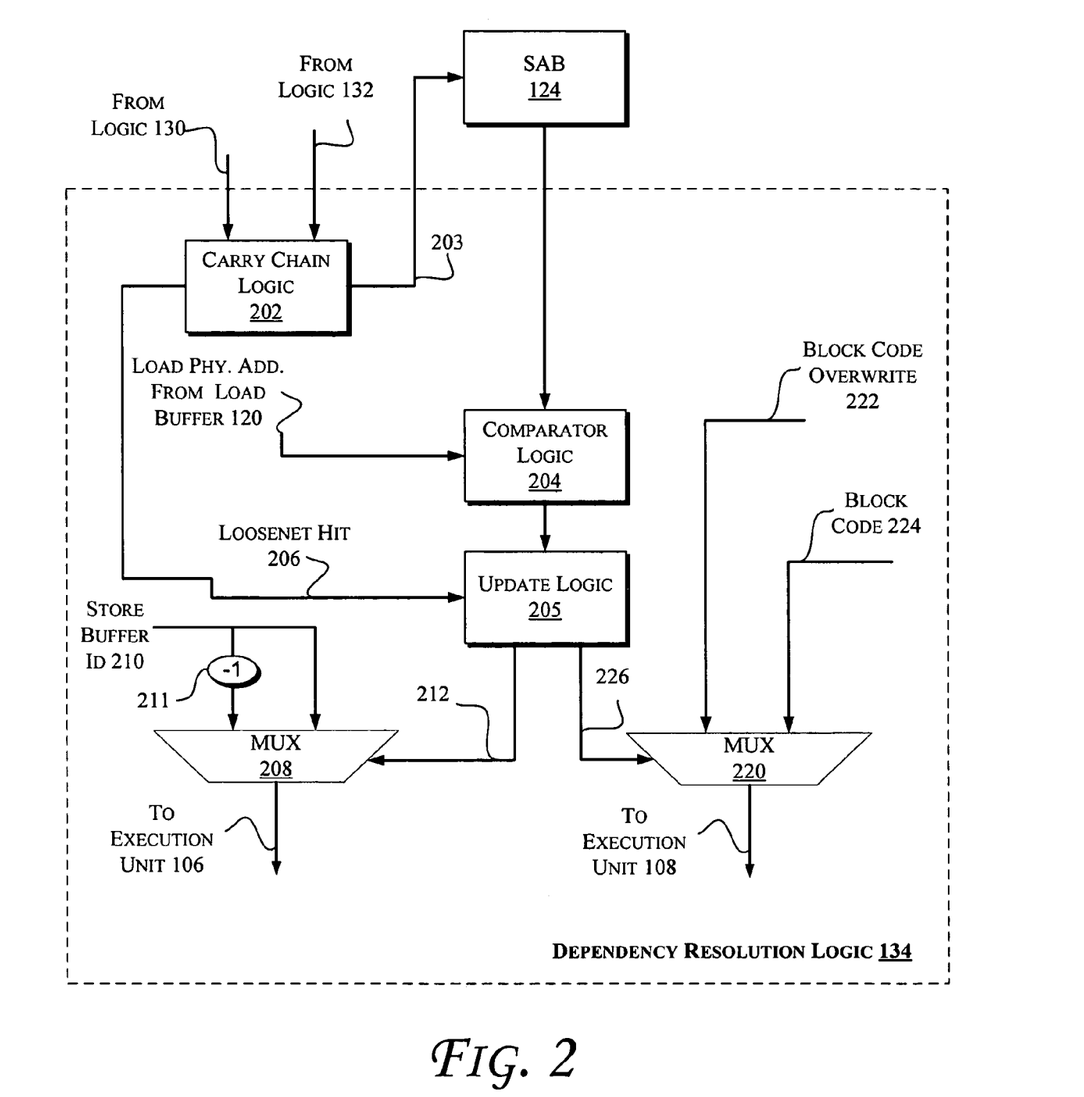
FIG. 2 illustrates a block diagram of a dependency resolution logic and other components of a processor core, according to an embodiment.

FIG. 2 illustrates a block diagram of the dependency resolution logic 134 and other components of a processor core, according to an embodiment. Referring to FIGS. 1-2, a carry chain logic 202 may receive signals from logics 130 and 132 that indicate the status of loosenet/finenet hits. In turn the logic 202 may generate a signal 203 corresponding to a store operation (e.g., an identifier of the store in the SAB 124) that has a loosenet hit and a finenet miss with the speculative load instruction. The signal 203 may cause the SAB 124 to output the physical address of the corresponding store operation, e.g., to enable a comparator logic 204 to compare the physical address of the store with the physical address of the load (e.g., from the load buffer 120). The output of the logic 204 may be provided to an update logic 205 together with a signal 206 from the logic 202 (e.g., to indicate whether a loosenet hit has occurred).

A multiplexer (MUX) 208 may receive one or more input signals, including a signal 210 corresponding to the store buffer identifier (SBID) of the store instruction and a decremented version of the store buffer identifier (e.g., through a decrementing logic 211). The multiplexer 208 may also receive a signal 212 generated by the logic 205 to select one of the inputs to the multiplexer 208.

A multiplexer (MUX) 220 may receive one or more input signals, including a signal 222 corresponding to a block code for overwriting an existing block code associated with the load instruction (to indicate that the load may proceed, for example) and a signal 224 corresponding to the block code from a previous check as will be further discussed with reference to FIG. 3 (e.g., to indicate that the load is to be blocked until the store operation from which the load depends successfully completes). As shown in FIG. 2, the multiplexer 220 may also receive a signal 226 generated by the logic 205 to select one of the inputs to the multiplexer 220. Also, as shown in FIG. 2, the outputs of multiplexers 208 and 220 may be provided to the execution unit 108 and/or the load buffer 120, e.g., for further processing.

Figure 3:
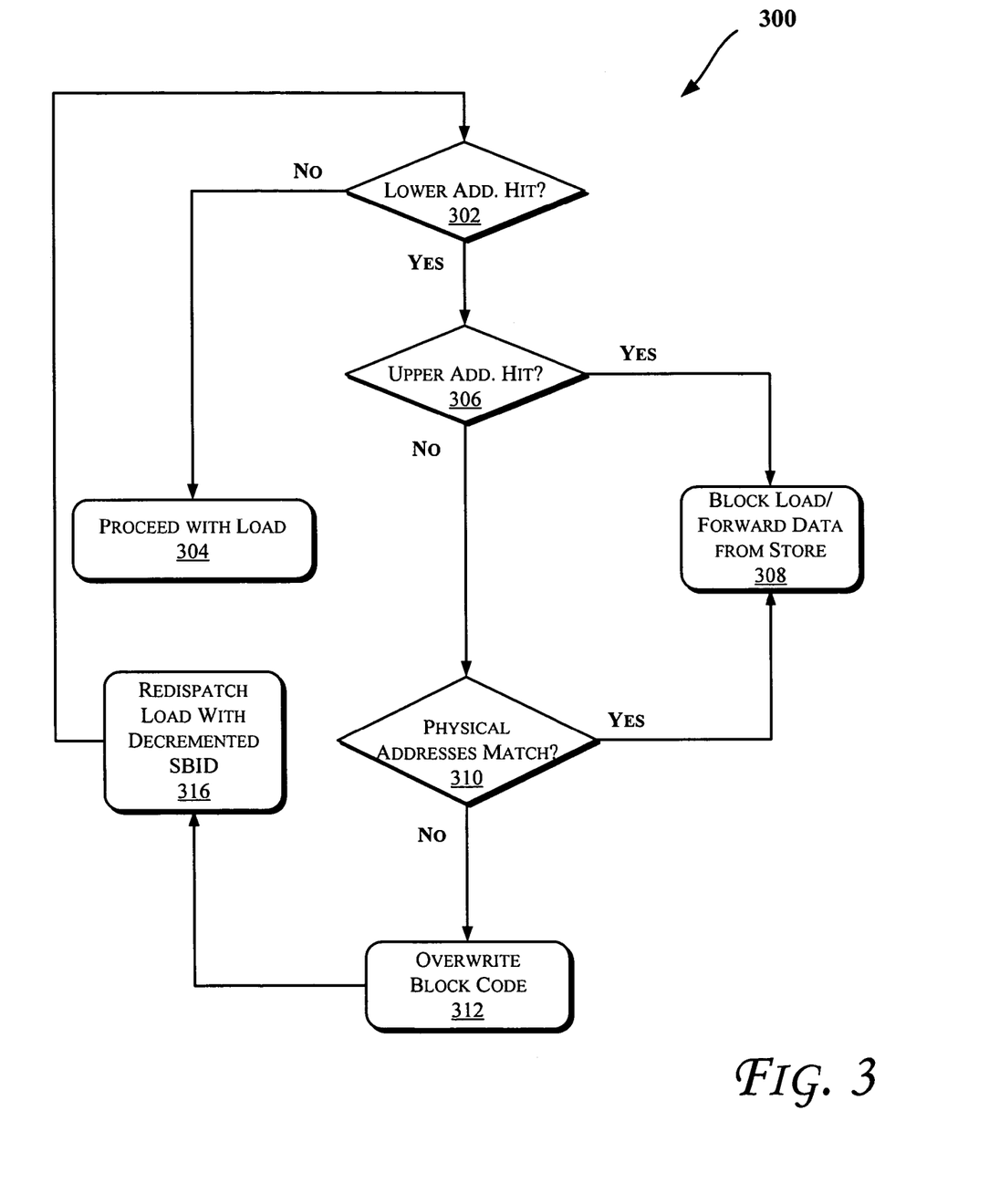
FIG. 3 illustrates a flow diagram of a method to resolve potential dependencies of a speculative load instruction, according to an embodiment.

FIG. 3 illustrates a flow diagram of a method 300 to resolve potential dependencies of a speculative load instruction, according to an embodiment. In some embodiments, various components discussed with reference to FIGS. 1-2 and 4-6 may be utilized to perform one or more of the operations discussed with reference to FIG. 3.

Referring to FIGS. 1-3, an operation 302 may determine whether the lower portion of the virtual address of a speculative load instruction matches the lower portion of virtual addresses of older store operations (e.g., corresponding to store instructions that have been fetched prior to the load instruction). In an embodiment, the logic 130 may perform operation 302 by referring to the entries within the store data buffer 119 and/or the SAB 124. If there is no hit at operation 302 (e.g., indicating no potential dependencies on an older store operations), then the load operation may proceed at an operation 304, e.g., by reading the L1 cache 111 or accessing the bus unit 117.

At operation 302, if a hit is present, an operation 306 may determine whether the upper portion of the virtual address of the speculative load instruction matches the upper portion of virtual addresses of older store operations. In an embodiment, the logic 132 may perform operation 306 by referring to the entries within the SAB 124. If there is a hit at operation 306, then the load operation may be blocked at an operation 308, e.g., until the store operation from which the load operation depends successfully completes. In an embodiment, the operation 308 may be performed by the multiplexer 220 selecting signal 224 as its output, e.g., resulting in storage of a block code in a corresponding entry of the load buffer 120. Furthermore, in an embodiment, the load instruction may have its input data forwarded from the store operation from which the load instruction depends at operation 308.

If there is a hit at operation 302 and a miss at operation 306, as discussed with reference to FIG. 2, the physical addresses of the load instruction and the store operation may be compared at an operation 310. In an embodiment, the logic 204 may compare the physical addresses of the load instruction and the youngest of the older loosenet matching store operations at operation 310. This approach may allow for addressing memory aliasing situations, e.g., where uops may have the same physical address but different virtual addresses. Hence, if the translated portions (e.g., upper portions in an embodiment) of the virtual addresses differ, the load and store operations may still be dependent because they could be aliased to the same physical address. If the physical addresses match at operation 310 (e.g., indicating a real dependency), the method 300 may continue with the operation 308.

In one embodiment, if there is a hit at operation 302 and the physical address of the load or the store operations is not valid, the physical address check at operation 310 may be considered as a hit and the method 300 may continue at operation 308. In one instance, if the physical address of the load instruction is not valid, the load instruction may be blocked due to DTLB 118 miss. Further, if the physical address of the store operation is not valid, the outcome may be based on the finenet hit/miss results in one embodiment or the load operation may be blocked on this store operation until the physical address of the store operation is resolved in an embodiment.

If the physical addresses are different at operation 310, then the potential dependency prior to the operation 310 is false. As such, at an operation 312, the previous block code with the load instruction may be overwritten (e.g., cleared) such as discussed with reference to FIG. 2. More specifically, in an embodiment, the multiplexer 220 may select signal 222 as its output (based on the signal 226 generated by the update logic 205) at operation 312. In an embodiment, at operation 312, in the load buffer 120 entry corresponding to the load operation, the block code is overwritten with NO_BLOCK, and the SBID is overwritten with the SBID of the false-hit store operation decremented by 1. After operation 312, the method 300 may continue with operation 316.

In some embodiments, the physical address check at operation 310 may use a partial physical address, e.g., base on data stored in the SAB 124. This makes the checking at operation 310 conservative. Accordingly, in some embodiments, a match may occur on a partial address and block, when a match would have otherwise not been made on the full address. Also, the load's store buffer identifier (or store color) may be decremented and written back into the load buffer 120 at operation 316 if a false dependency is detected at operation 310 (where the physical addresses do not match). An example will now be discussed with reference to tables 1 and 2.

TABLE 1

| SBID | uop | Upper Bits of Virtual Address | Lower Bits of Virtual Address | Physical Address |
|---|---|---|---|---|
| 1 | STA | t | x | e |
| 2 | STA | s | x | b |
| 3 | STA | s | z | b |
| 4 | STA | u | x | a |
| 5 | STA | t | y | e |
| 5 | LD | t | x | e |

TABLE 2

| Iteration | Load's Store Color | Comment |
|---|---|---|
| 1 | 5 | loosenet hits in SBID 4 with false dependency |
| 2 | 3 | loosenet hits in SBID 2 with false dependency |
| 3 | 1 | loosenet hits in SBID 1 with real dependency |

In the above tables, Table 1 shows the store operation that have been decoded by the decode unit 104 but not yet completed, before the load operation enters the decode unit 104. x, y, and z are 3 different values corresponding to the lower bits of the virtual address (or untranslated bits) and used for loosenet check in 130/302. s, t, and u are the values corresponding to the upper bits of the virtual address used in the logic 132 (e.g., at operation 306). a, b, and e are values corresponding to the physical address translation of the upper bits of the virtual addresses. As shown in Table 2, the load operation may initially have a store color 5. The initial loosenet check of the load operation against older store operations at operation 302 hits in SBID 4, which is the youngest of the older stores matching on the untranslated address. The store operation 4 and the load operation have different linear addresses, resulting in a finenet miss at operation 306. Since the physical address match determines it is a false dependency in the first iteration, the load operation's store color is decremented by one to 3. In the next iteration, the loosenet check hits at operation 302 in SBID 2 with another false dependency and the load's store color is changed again decremented by one to 1. In the third iteration, the loosenet check hits at operation 302 in SBID 1. The latter is a real dependency and the load may receive data forwarded from the store.

Figure 4:
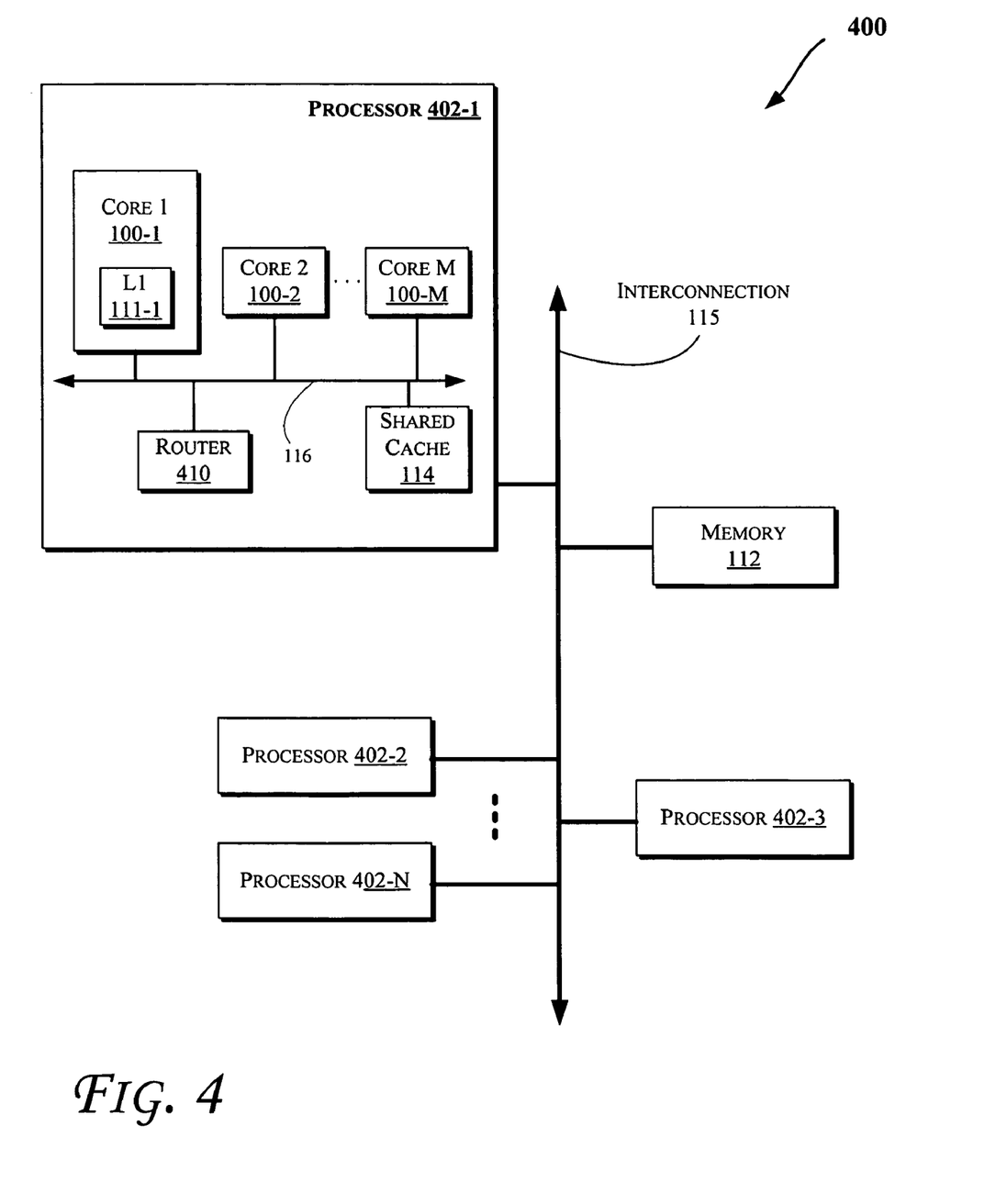
FIGS. 4-6 illustrate block diagrams of computing systems in accordance with various embodiments of the invention.

FIG. 4 illustrates a block diagram of a computing system 400, according to an embodiment of the invention. The system 400 may include one or more processors 402-1 through 402-N (generally referred to herein as "processors 402" or "processor 402"). The processors 402 may communicate via the interconnection network or bus 115. Each processor may include various components some of which are only discussed with reference to processor 402-1 for clarity. Accordingly, each of the remaining processors 402-2 through 402-N may include the same or similar components discussed with reference to the processor 402-1.

In an embodiment, the processor 402-1 may include one or more processor cores 100-1 through 100-M (which may be the same or similar to the processor core 100 of FIG. 1, and referred to herein as "cores 100" or "core 100"), the shared cache 114, and/or a router 410. The processor cores 100 may be implemented on a single integrated circuit (IC) chip. Moreover, the chip may include one or more shared caches (such as cache 114) and/or private caches (such as level 1 (L1) cache 111-1, generally referred to herein as "L1 cache 111"), buses or interconnections (such as bus or interconnection network 115 or 116), memory controllers (such as those discussed with reference to FIGS. 5 and 6), or other components.

In one embodiment, the router 410 may be used to communicate between various components of the processor 402-1 and/or system 400. Moreover, the processor 402-1 may include more than one router 410. Furthermore, the multitude of routers 410 may be in communication to enable data routing between various components inside or outside of the processor 402-1.

The shared cache 114 may store data (e.g., including instructions) that are utilized by one or more components of the processor 402-1, such as the cores 100. Further, the shared cache 114 may locally cache data stored in the memory 112 for faster access by components of the processor 402. In an embodiment, the cache 114 may include a mid-level cache (such as a level 2 (L2), a level 3 (L3), a level 4 (L4), or other levels of cache), a last level cache (LLC), and/or combinations thereof. Moreover, various components of the processor 402-1 may communicate with the shared cache 114 directly, through a bus (e.g., the bus 116), and/or a memory controller or hub.

Figure 5:
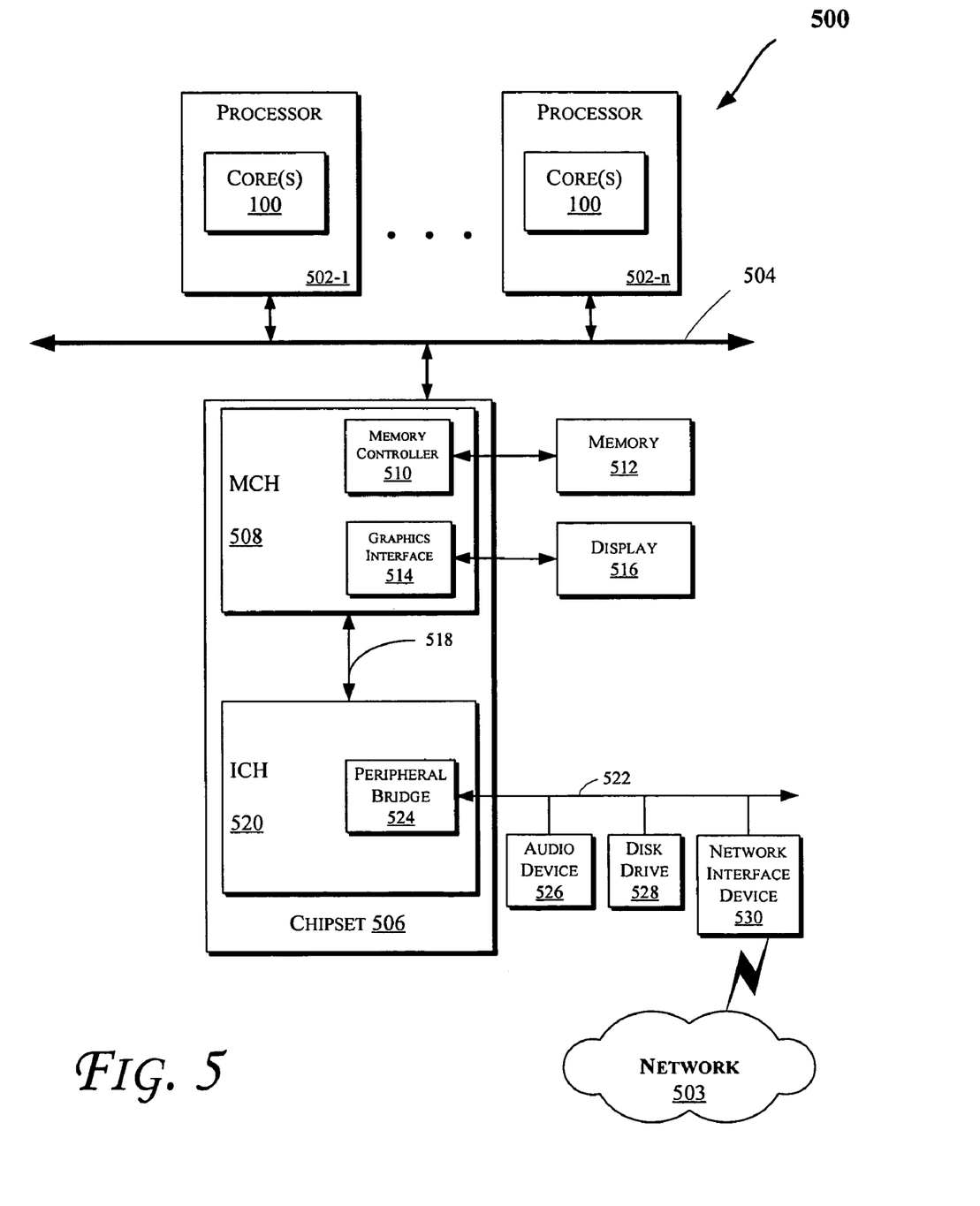

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 402 of FIG. 4. For example, one or more of the processors 502 may include one or more of the cores 100 discussed with reference to FIG. 1. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 112 of FIGS. 1 and 4). The memory 512 may store data, including sequences of instructions, which may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, a graphics accelerator may be included within the MCH 508 in other embodiments of the invention.

Furthermore, the computing system 500 may include volatile and/or nonvolatile memory (or storage unit). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
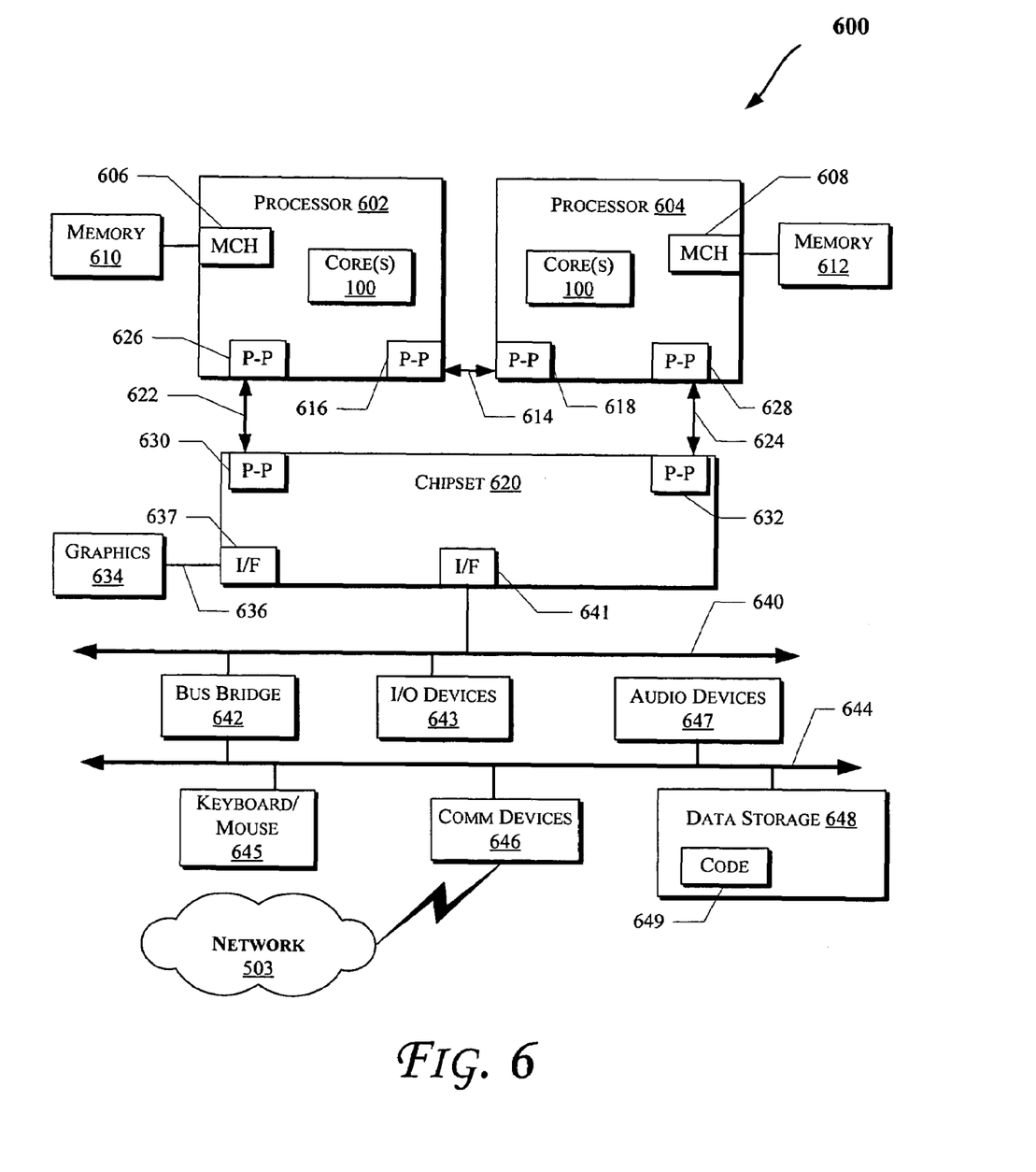

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the core 100 of FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
    logic circuit to detect whether there is a potential dependency of a load operation on a store operation and, if so, to cause detection of whether a first physical address corresponding to the load operation matches a second physical address corresponding to the store operation in response to a determination that:
        a first portion of a first virtual address corresponding to the first physical address matches a first portion of a second virtual address corresponding to the second physical address; and
        a second portion of the first virtual address is different than a second portion of the second virtual address.

2. The processor of claim 1, wherein the load operation is to cause reading of data from a location identified by the first virtual address.

3. The processor of claim 2, wherein the first portion of the first virtual address and the first portion of the second virtual address respectively correspond to an untranslated portion of the first virtual address and an untranslated portion of the second virtual address.

4. The processor of claim 2, wherein the second portion of the first virtual address and the second portion of the second virtual address respectively correspond to a translated portion of the first virtual address and a translated portion of the second virtual address.

5. The processor of claim 2, wherein the location corresponds to an entry in a memory unit.

6. The processor of claim 5, wherein the memory unit comprises one or more of a level 1 cache, a mid-level cache, or a last level cache.

7. The processor of claim 1, wherein the store operation is a youngest of older store operations amongst a plurality of pending store operations.

8. The processor of claim 7, further comprising a store buffer to store information corresponding to the plurality of pending store operations.

9. The processor of claim 7, further comprising a store address buffer to store data corresponding to physical addresses of the plurality of pending store operations.

10. The processor of claim 7, further comprising a logic to cause the load operation to be redispatched for comparison against a prior one of the plurality of pending store operations.

11. The processor of claim 1, further comprising a logic to cause the load operation to proceed in response to a detection that the first physical address and the second physical address are different.

12. The processor of claim 1, wherein the processor comprises a plurality of processor cores, wherein at least one of the plurality of processor cores comprises the logic circuitry.

13. The processor of claim 1, wherein one or more of the logic circuitry, a plurality of processor cores, or a cache are on a same integrated circuit die.

14. A method comprising:
  determining, by a logic circuitry, if a first physical address corresponding to a load instruction matches a second physical address corresponding to a store instruction in response to determining that:
    a first portion of a first virtual address corresponding to the first physical address matches a first portion of a second virtual address corresponding to the second physical address; and
    a second portion of the first virtual address is different than a second portion of the second virtual address.

15. The method of claim 14, wherein the first portion of the first virtual address and the first portion of the second virtual address respectively correspond to an untranslated portion of the first virtual address and an untranslated portion of the second virtual address.

16. The method of claim 14, wherein the second portion of the first virtual address and the second portion of the second virtual address respectively correspond to a translated portion of the first virtual address and a translated portion of the second virtual address.

17. The method of claim 14, further comprising selecting the store instruction from a plurality of pending store instructions.

18. The method of claim 17, further comprising causing the load instruction to be redispatched for comparison against a prior one of the plurality of pending store instructions.

19. The method of claim 17, further comprising causing the load instruction to proceed in response to a determination that the first physical address and the second physical address are different.

20. The method of claim 14, further comprising fetching the load instruction for execution after the store instruction.

21. A computing system comprising:
  a memory to store a load instruction and a store instruction; and
  a processor to fetch the load instruction and the store instruction to determine whether there is a potential dependency of the load instruction on the store instruction, wherein the store instruction is to cause storage of data in a first entry of the memory identified by a first virtual address,
  wherein the processor is to comprise logic to determine if a first physical address corresponding to the load instruction matches a second physical address corresponding to the store instruction in response to a determination that:
    a first portion of the first virtual address corresponding to the first physical address matches a first portion of a second virtual address corresponding to the second physical address; and
    a second portion of the first virtual address is different than a second portion of the second virtual address.

22. The system of claim 21, further comprising a logic to determine whether the first physical address corresponding to the first virtual address matches the second physical address corresponding to the second virtual address.

23. The system of claim 22, further comprising a logic to cause the load instruction to proceed in response to a determination that the first physical address and the second physical address are different.

24. The system of claim 22, further comprising a logic to cause the load instruction to be redispatched for comparison against a prior one of a plurality of pending store operations.

25. The system of claim 21, wherein the first portion of the first virtual address and the first portion of the second virtual address respectively correspond to an untranslated portion of the first virtual address and an untranslated portion of the second virtual address.

26. The system of claim 21, wherein the second portion of the first virtual address and the second portion of the second virtual address respectively correspond to a translated portion of the first virtual address and a translated portion of the second virtual address.

27. The system of claim 21, wherein the processor fetches the load instruction after the store instruction.

28. The system of claim 21, wherein the memory comprises one or more of a DRAM, SDRAM, or SRAM.

29. The system of claim 21, wherein the processor comprises a plurality of processor cores.

30. The system of claim 21, further comprising an audio device coupled to the processor.

* * * * *

UNITED STATES PATENT AND TRADEMARK OFFICE
CERTIFICATE OF CORRECTION

PATENT NO. : 7,603,527 B2  Page 1 of 1
APPLICATION NO. : 11/541364
DATED : October 13, 2009
INVENTOR(S) : Hily et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this

Fifth Day of October, 2010

David J. Kappos
*Director of the United States Patent and Trademark Office*